US006867746B2

(12) United States Patent
Mendolia et al.

(10) Patent No.: US 6,867,746 B2
(45) Date of Patent: Mar. 15, 2005

(54) COMBINED EMI SHIELDING AND INTERNAL ANTENNA FOR MOBILE PRODUCTS

(75) Inventors: Greg S. Mendolia, Ellicott City, MD (US); William E. McKinzie, III, Fulton, MD (US)

(73) Assignee: Kaga Electronics Co., Ltd., Tokyo (JP)

(*) Notice: Subject to any disclaimer, the term of this patent is extended or adjusted under 35 U.S.C. 154(b) by 2 days.

(21) Appl. No.: 10/453,474

(22) Filed: Jun. 3, 2003

(65) Prior Publication Data

US 2004/0032371 A1 Feb. 19, 2004

Related U.S. Application Data

(60) Provisional application No. 60/385,495, filed on Jun. 3, 2002.

(51) Int. Cl.[7] .................................................. H01Q 1/52
(52) U.S. Cl. ............................. 343/841; 343/700 MS; 343/702
(58) Field of Search ................... 343/700 MS, 702, 343/841, 846, 848; 455/90.3, 575.5

(56) References Cited

U.S. PATENT DOCUMENTS

| 4,074,211 A | 2/1978 | Bates ......................... 343/895 |
| 4,151,476 A | 4/1979 | Jasper, Jr. ................... 343/895 |
| 5,335,366 A | 8/1994 | Daniels ........................ 455/89 |
| 5,392,461 A | 2/1995 | Yokoyama .................... 455/89 |
| 5,483,246 A | 1/1996 | Barnett et al. ........ 343/700 MS |
| 5,936,587 A | 8/1999 | Gudilev et al. ............. 343/752 |
| 6,094,170 A | 7/2000 | Peng .................... 343/700 MS |
| 6,133,886 A | * 10/2000 | Fariello et al. .............. 343/702 |
| 6,259,933 B1 | * 7/2001 | Bambridge et al. .......... 455/557 |
| 6,271,794 B1 | * 8/2001 | Geeraert .............. 343/700 MS |
| 6,373,440 B2 | 4/2002 | Apostolos ................... 343/744 |
| 6,380,900 B1 | 4/2002 | Kanayama .................. 343/702 |
| 6,452,548 B2 | 9/2002 | Nagumo et al. ..... 343/700 MS |
| 6,476,771 B1 | 11/2002 | McKinzie, III ............. 343/756 |
| 2002/0022459 A1 | * 2/2002 | Kobayashi .................... 455/90 |
| 2002/0024473 A1 | 2/2002 | Thursby et al. ....... 343/700 MS |
| 2002/0041254 A1 | * 4/2002 | Nakano et al. ....... 343/700 MS |
| 2002/0118142 A1 | 8/2002 | Wang ................... 343/700 MS |
| 2002/0149521 A1 | 10/2002 | Hendler et al. ....... 343/700 MS |
| 2003/0103014 A1 | * 6/2003 | Birnbaum et al. .......... 343/841 |
| 2003/0160725 A1 | * 8/2003 | Baxter et al. ............... 343/702 |

OTHER PUBLICATIONS

International Search Report in corresponding International Application No. PCT/US03/17344, dated Sep. 10, 2003, 4 pages.

* cited by examiner

Primary Examiner—Tan Ho
(74) Attorney, Agent, or Firm—Brinks Hofer Gilson & Lione (57) ABSTRACT

A combined antenna and electromagnetic shield include a dielectric body mountable to a printed circuit board (PCB), antenna metallization disposed on a first side of the dielectric body and shield metallization disposed on a second side of the dielectric body. The shield metallization serves both as a ground plane for the antenna metallization and as an electromagnetic interference shield for circuit and components on the PCB below. Physical parameters of the component, such as thickness and composition, can be designed to tailor the performance of the antenna formed by the device. Antenna height can be defined by an injection mold, which dramatically reduces variability in the performance of production antennas.

26 Claims, 5 Drawing Sheets

COMBINED EMI SHIELDING AND INTERNAL ANTENNA FOR MOBILE PRODUCTS

REFERENCE TO RELATED APPLICATIONS

The present patent document claims the benefit of the filing date under 35 U.S.C. § 119(e) of Provisional U.S. patent application Ser. No. 60/385,495, filed Jun. 3, 2002, which is hereby incorporated herein in its entirety by this reference.

BACKGROUND

The present invention relates generally to electromagnetic components. More particularly, the present invention relates to combined electromagnetic interference (EMI) shielding and internal antennas for mobile products.

Designers of all electronic devices are under constant pressure to reduce physical size, weight and cost of the devices, and improve the electrical performance of such devices. This is particularly true of mobile devices such as cellular, personal communication system (PCS) and cordless telephones, personal digital assistants (PDAs) and other portable radio communication devices. The classification of a device as mobile and portable requires that the device be physically very small and lightweight. If the mobile or portable device is battery operated, its components must have high performance including low current drain. Since many mobile devices are intended for consumer purchase, they and their components must be low cost in accordance with the low profit margins on consumer devices. This low cost requirement also dictates that the electronic device be simple and inexpensive to manufacture. Manufacturing should be automated, with as few steps as possible, and the components and the steps to assemble them should not introduce defects which can compromise production yields.

Radio communication devices typically required shielding between sources of electromagnetic interference (EMI) and sensitive circuitry. Conventionally, such devices include one or more printed circuit boards contained within a housing. EMI shields isolate the circuitry from EMI source so that the energy emitted by the EMI source does not affect the circuitry. Known deleterious effects in the absence of suitable EMI shielding include unwanted frequency shifts, oscillations, intermodulation distortion, overloading of receive circuits during transmission, etc. EMI shields are also used to reduce cross talk between different subsystems, such as the receiver and transmitter in a transceiver.

Figure 1:
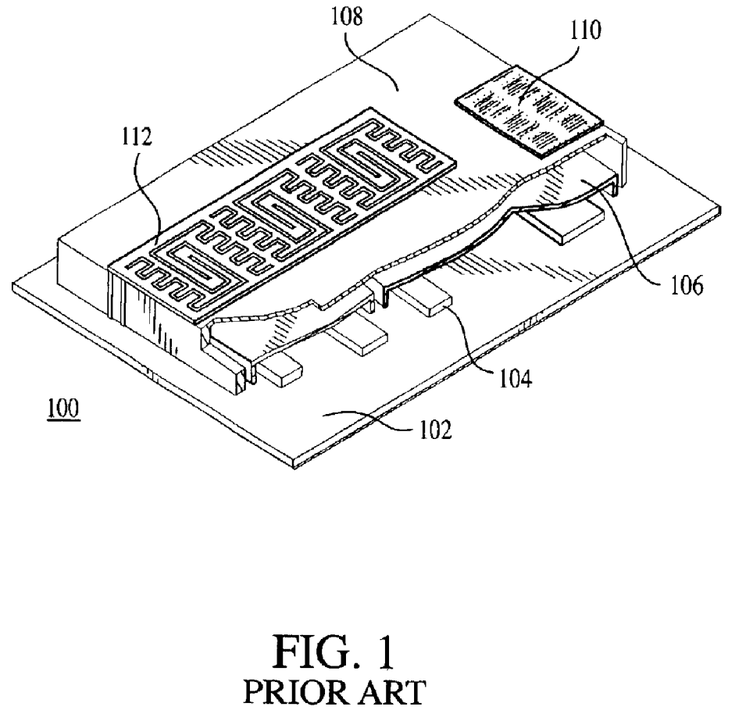
FIG. 1 is an isometric view of a prior art internal antenna combined with electromagnetic interference shields.

FIG. 1 is an isometric view of a prior art electronic device 100 including internal antennas combined with electromagnetic interference shields. The device 100 includes a printed circuit board 102 with electronic components 104 mounted thereon. An EMI shield 106, also referred to as a can, is positioned over some or all of the components 104. A plastic support frame 108 is positioned over the EMI shield 106. One or more antennas 110, 112 are disposed on the plastic support frame 108.

The electronic components 104 may perform any of the digital, analog, or RF functions of the electronic device 100. The EMI shield 106 forms a ground plane for the antennas 110, 112. Thus, the EMI shield 106 is in electrical contact with the printed circuit board 102 so that the EMI shield 106 is electrically grounded. The antennas 110, 112 must electrically contact the printed circuit board 102 at a feed point driven by receive or transmit circuitry of the printed circuit board 102.

The conventional solution shown in FIG. 1 has been effective but there is still room for improvement. For example, the illustrated solution requires additional space in the plane of the printed circuit board 102 to mount both the EMI shield 106 and the plastic support frame 108. To minimize manufacturing costs, these components must be compatible with surface mount manufacturing processes. Proper tolerances must be maintained in spacing these components from other components such as the electronic components 104. Since electrical contacts must be made when placing the EMI shield 106 and the antennas 110, 112, these components must be reliably soldered to the printed circuit board 102. Proper vertical tolerances above the plane of the printed circuit board 102 must be maintained as well. The antenna resonant frequency is dependent on the vertical spacing between the radiating antennas 110, 112 and the ground plane formed by the EMI shield 106. However, vertical tolerances are particularly difficult to control in a surface mount assembly process.

Accordingly, there is a need for an improved antenna and EMI shield method and apparatus.

BRIEF SUMMARY

By way of introduction only, an antenna and electromagnetic shield apparatus include a dielectric body mountable to a printed circuit board (PCB), antenna metallization disposed on a first side of the dielectric body, and shield metallization disposed on a second side of the dielectric body. The shield metallization serves both as a ground plane for the antenna metallization and as an electromagnetic interference shield for components on the PCB below. The apparatus may be embodied as a single combined component, which can be assembled in accordance with conventional automated PCB assembly techniques. Physical parameters of the component, such as thickness and composition, can be designed to tailor the performance of the antenna formed by the device.

DETAILED DESCRIPTION OF THE DRAWINGS AND PRESENTLY PREFERRED EMBODIMENTS

Figure 2:
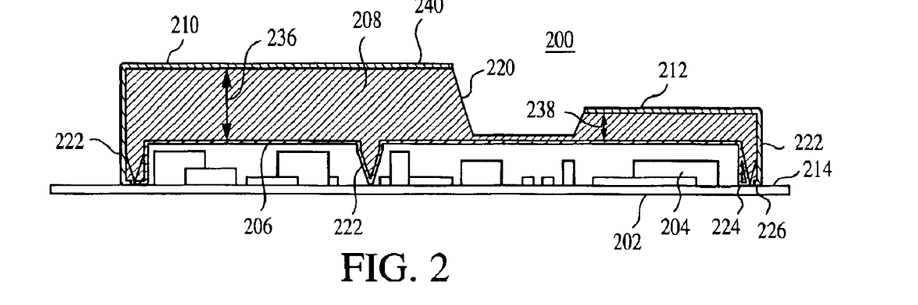
FIG. 2 is a cross-sectional view of a first embodiment of a combined electromagnetic shield and antenna.
Figure 3:
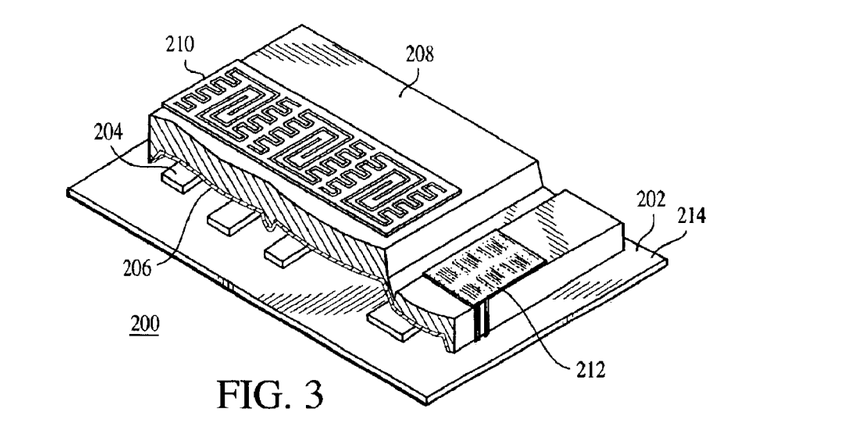
FIG. 3 is an isometric view of a first embodiment of a combined electromagnetic shield and internal antenna, showing the antenna feed and ground terminals.

FIG. 2 is a cross-sectional view of a first embodiment of a combined electromagnetic shield and antenna apparatus 200. FIG. 3 is an isometric view of the apparatus 200 of FIG. 2. The apparatus is disposed on a printed circuit board (PCB) 202 of an electronic device. The apparatus 200 provides shielding from electromagnetic interference (EMI) for electronic components 204 positioned on the PCB 202. The apparatus 200 also incorporates one or more radiating antennas which are driven by circuitry of the PCB 202. The electronic device which includes the PCB 202 may be any device which requires an antenna for radio transmission or reception and which may require shielding of electronic components from EMI or other energy. Examples include a radiotelephone such as a cellular, PCS or cordless telephone, two-way radio, PDA and wireless local area network adapter.

The antenna and electromagnetic shield apparatus 200 includes a dielectric body 208 mountable to the PCB, antenna metallization 210, 212 disposed on a first side of the dielectric body and adapted for electrical connection with the PCB, and shield metallization 206 disposed on a second side of the dielectric body and adapted for electrical connection with the PCB 202. The apparatus 200 is designed for surface mount assembly with the PCB 202 in the same process with the electronic components 204. The electronic components 204 typically include integrated circuits, passive devices such as resistors and capacitors and other components as well. A variety of surface mount technologies have been developed and the embodiments described herein may be readily adapted to the widest variety of these embodiments. In one typical process, a solder paste is applied to a metallization pattern on the surface 214 of the PCB 202 using a stencil or other technique. The electronic components 204 are placed by a high speed pick and place machine. The apparatus 200 is then placed over the electronic components 204, maintaining appropriate spacing from other components in accordance with established manufacturing tolerances. The entire assembly is passed through a temperature profile oven unit via a conveyor line system to melt and reflow the solder paste. A visual inspection and electrical board test completes the process.

Accordingly, in embodiments in which the apparatus 200 is subjected to an automated assembly process, the dielectric body 208 must be designed to survive this automated assembly process. The dielectric body 208 must be formed of a material adequate to withstand the mechanical operation of the pick and place device as well as the high heat of the solder reflow apparatus. Preferably, to reduce parts count and manufacturing process, the dielectric body 208 is molded as a single element. In this embodiment, the dielectric body 208 is molded from liquid crystal polymer (LCP). Other suitable materials, such as plastics or nylon, may be used as well. Further, the composition of the dielectric body 200 can be tailored to dielectric requirements of the antenna or antennas embodied in the apparatus. Other variations in the design of the dielectric body 208 will be described below.

As is best shown in the cross section of FIG. 2, the dielectric body 208 includes a supported portion 220 and two or more support portions 222. The support portions 222 are configured for mechanical and electrical engagement of the PCB 202. One or more of the support portions 222 thus includes an EMI shield ground contact 224 and antenna contacts 226. During automatic assembly, these contacts 224, 226 are electrically joined to appropriate nodes in the circuit formed by the electronic components 204. For example, these contacts 224, 226 may match in size, shape and positioning complementary contacts of the PCB 202. Solder paste is applied to the PCB contacts and the apparatus 200 is placed on the surface 214 of the PCB in the solder paste which is subsequently reflowed to form a reliable electrical and mechanical contact between the apparatus 200 and the PCB 202. Other attachment techniques, such as contact posts of the apparatus which extend through plated-through holes of the PCB 202, may be substituted.

The apparatus 200 may be manufactured in any suitable manner to provide the advantages described herein. In one embodiment, a method for manufacturing an electromagnetic shield and antenna includes molding a dielectric body having appropriate dimensions to shield circuitry portions of an electronic device. Antenna metallization is disposed on a first side of the dielectric body and ground plane metallization is disposed on a second side of the dielectric body. The metallization may be plated on the surface of the body, or may be deposited or plated and subsequently patterned.

Figure 4:
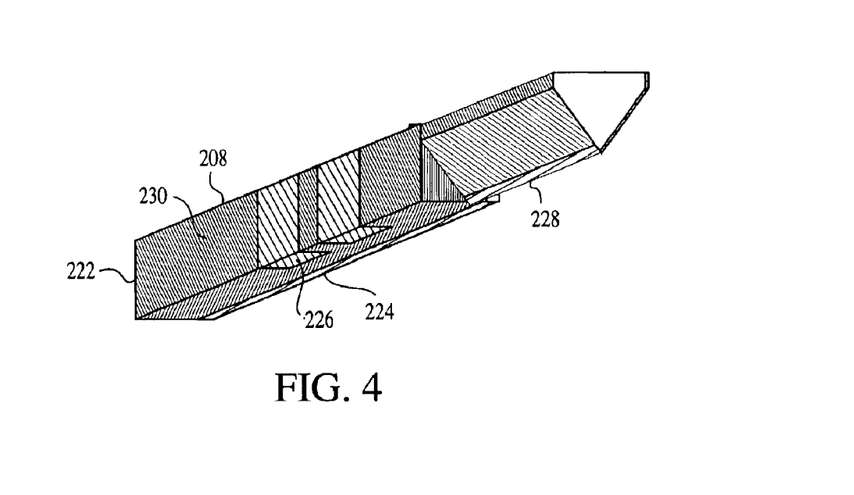
FIG. 4 is a detailed isometric view of the combined electromagnetic shield and internal antenna of FIG. 2.

FIG. 4 illustrates one enhancement that may be made to the support portions 222. The support portions 222 are tapered at the ground contact 224, 228 for the EMI shield of the apparatus. The contact for the shielding has a V-shape base to minimize the contact area required on the PCB 202 and to allow a solder fillet to form on each side of the V-shaped support portion 222 during surface reflow. Also visible in the detail view of FIG. 4, the antenna contacts 226 are routed down the side 230 of the support portion 222. The metallization is formed on the side 230 and lower surface of the support portion 222 so as to electrically contact the surface 214 of the PCB 202.

The support portions 222 may form point contacts around the perimeter of the apparatus 200, contacting the PCB 202 where possible based on the arrangement of the electronic components 204 on the surface 214 of the PCB 202. Alternatively, the support portions 222 may extend completely around the perimeter, forming a complete, grounded electrical and mechanical connection between the entire perimeter and the PCB 202. Further, there may be support portions extending from the central region of the supported portion 220 of the apparatus, as shown in the cross section of FIG. 2. Thus, one or more cavities can be created for various sections of the circuit, such as the radio transmitter, receiver or portions of the baseband circuit. Such a design helps to isolate these circuits from one another, and from outside interference.

When mounted to the PCB 202, the dielectric body 208 has a first side distal the PCB 202 and a second side proximate the PCB 202 and electronic components 204. In the preferred embodiment, metallization is formed on both the first side and the second side of the dielectric body 208. In the exemplary embodiment of FIGS. 2 and 3, the metallization on the first side includes first antenna metallization 210 and second antenna metallization. Any number of antennas or antenna metallization structures may be used. For example, two antennas may be formed to provide spatial diversity for the radio including the apparatus 200. These antennas may be any type of printed antenna including planar inverted F antennas (PIFAs), meander line antennas, patch antennas or DC inductive shorted patch antennas (DSPA). DSPAs are disclosed in provisional patent application entitled "DC Inductive Shorted Patch Antennas," with Ser. No. 60/354,003, filed on Jan. 23, 2002, in the name of inventors McKinzie, Mendolia, and Dutton.

When grounded, the metallization 206 on the second side of the dielectric body 208 forms an EMI shield between the electronic components 204 on the surface 214 of the PCB 202 and the antenna radiating elements formed by the antenna metallization 210, 212. Moreover, the metallization 206 also forms a ground plane for the antenna radiators formed by the antenna metallization 210, 212. The EMI shield metallization 206 can be formed on the second side of the dielectric body 208 using any suitable process, such as plating. Also, the EMI shield metallization 206 can be formed with any suitable shape. For example, the metallization 206 can be formed as a single conductor on substantially all of the second side of the dielectric body. Alternatively, the metallization 206 can be a meshed or gridded conductor, or any conductive surface with arrays of electrically-small apertures.

Most antennas radiate at frequencies which are dependant on their geometry, their height above the ground plane, and the dielectric constant of the materials that they are made of. In the illustrated embodiments of the apparatus 200, the antennas formed by antenna metallization 210, 212 are spaced from the ground plane formed by the EMI shield metallization 206. In accordance with one embodiment, the thickness of the dielectric body 208 over the EMI shield metallization 206, normally kept as thin as possible, can be tailored to create the appropriate height or space between antenna radiators and ground plane so as to optimize antenna performance, including efficiency, bandwidth and frequency of operation). Thus, in the embodiment of FIG. 2, the antenna formed by metallization 210 has a dielectric thickness 236 of a specified value. The antenna formed by metallization 212 has a dielectric thickness 238 less than the dielectric thickness 236. To reduce the volume and weight of the apparatus 200, the thickness of the plastic material can be kept to a minimum in the areas such as area 240 where no antennas are needed.

The combined electromagnetic shield and internal antenna illustrated as apparatus 200 in various embodiments in FIGS. 2, 3 and 4 has been illustrated with flat surfaces on the first side and the second side. However, these surfaces can take a very wide variety of shapes, either for the inner surface of the EMI shields or the outer surface of the antennas. Thus, optimum use of the internal volume of an electronic device incorporating such an apparatus 200 can be achieved by contouring these surfaces to conform to the handset's housing (usually curved) and components on the PCB.

Figure 5:
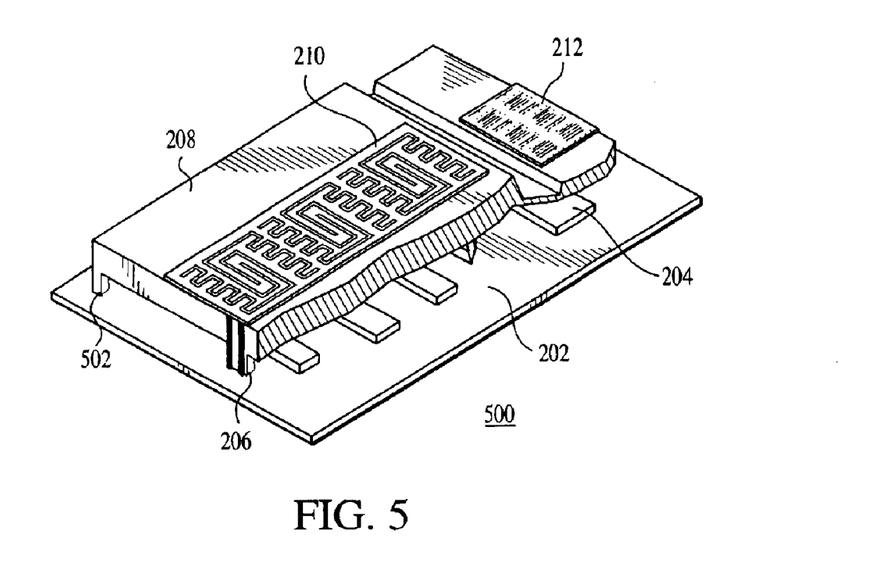
FIG. 5 is an isometric view of a second embodiment of a combined electromagnetic shield and antenna.

FIG. 5 is an isometric view of a second embodiment of a combined electromagnetic shield and antenna apparatus 500. The apparatus 500 includes a dielectric body 208 having antenna metallization 210, 212 on a first side and metallization 206 on a second side. The apparatus 208 is mounted on a printed circuit board (PCB) 202 along with other electronic components 204. In this embodiment, EMI shielding is not required to isolate the electronic components 204 from the antennas formed by antenna metallization 210, 212. However, those antennas still require adjacent ground planes spaced an effective distance from the radiators formed by the antenna metal. The function of the ground plane is formed by the metallization 206 on the second side of the dielectric body 208, proximate the printed circuit board.

The advantages provided by the ground plane formed by the metallization 206 can be realized by replacing the solid walls on the perimeter of the shield cans with a few small posts 502. These posts 502 act as stilts to lift the ground plane of the antenna, formed by the metallization 506, above the components on the PCB as shown in FIG. 5. The metallization 506 extends along the length of at least one of the posts 502 to form an electrical contact with ground metal of the PCB 202. In this embodiment, the apparatus 500 can be automatically assembled with other components 204 on the PCB 202, much like the process described above in connection with FIGS. 2–4.

Figure 6:
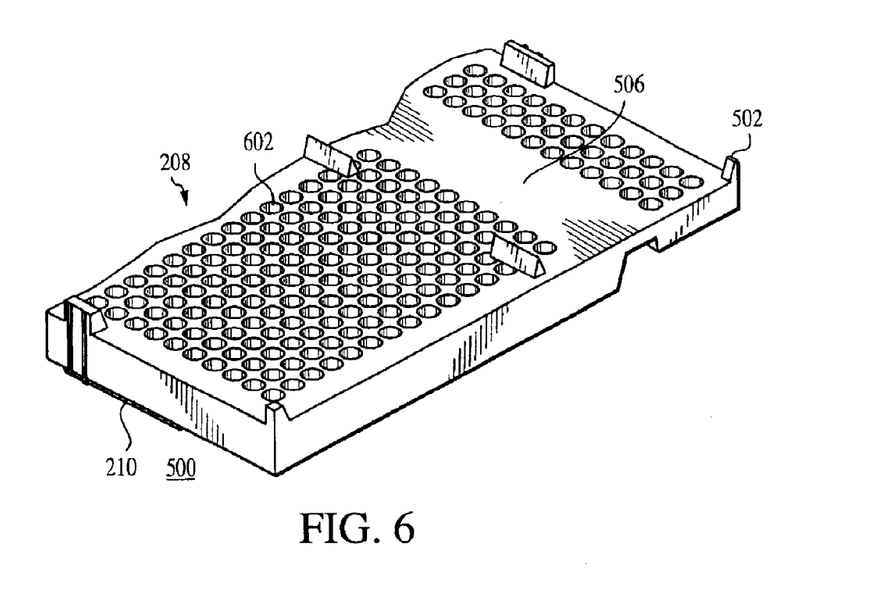
FIG. 6 is a view of the underside of the combined electromagnetic shield and antenna of FIG. 5.

FIG. 6 is a view of the underside of the combined electromagnetic shield and antenna apparatus of FIG. 5. To reduce the dielectric constant of the material between the antenna radiating metallization 210 and the ground plane metallization 206 below it, the plastic core of the dielectric body 208 can be molded such that the surface including the ground plane is hollowed out. This is done in the illustrated embodiment by adding slots or holes 602 in this surface as shown in FIG. 6. This will not only reduce the dielectric constant, but also reduce the variation from part to part of the dielectric constant since a larger percent of the medium is air. Only the bottom surface of this ground plane would be selectively plated or otherwise metallized, leaving the slots or holes 602 un-plated. While this technique of adding slots or holes to the surface of the dielectric body is shown in connection with the embodiment of FIG. 5, the same technique may be applied to the embodiments of FIGS. 2–4 as well as to others not illustrated in the drawing.

In one embodiment, the holes 602 are formed by molding the component with the holes 602 defined by the mold. In another embodiment, the holes may be defined by mechanically boring, chemically etching or in any suitable fashion. The holes 602 may be sized or shaped to meet any design requirements.

Further, the illustrated embodiment shows a regular pattern of holes 602 extending over substantially the entire surface of the dielectric body 208. In other embodiments, the pattern may be other than uniform. For example, a first density of holes, or holes of a first size and spacing and depth, may be formed in the dielectric body 208 in the vicinity of the first antenna. Those geometric parameters, or others, may be varied for holes in the vicinity of a second antenna. Still further, the holes could be filled with a dielectric material to further tailor the dielectric constant of the dielectric body, and thus the performance of the antenna.

The disclosed embodiments provide for an improved antenna and EMI shield method and apparatus. A single, surface mountable component is formed with antenna metallization on one side and ground plane metallization on the second side, interposed between the antenna metallization and components of a printed circuit board to be shielded. Provision is made for electrical contact between the antenna and the printed circuit board for driving the antenna. The ground plane metallization is grounded to the printed circuit board. The physical geometry and composition of the component may be adjusted to tailor the performance of antennas formed on the component.

There are many advantages to this combination of components. First, the component provides the ability to precisely control the height of the radiating surface above the ground plane. Traditionally, with separate components and internal antennas fabricated out of bent metal, the manufacturing of the individual antenna had to be done to exacting tolerances. The slightest defect or process variation can de-tune the frequency of operation enough to be out-of-band and thus not meet specification. Of all the parameters that can affect the frequency of operation, height is the dominant feature that causes frequency shifts for the vast majority of internal antenna designs and approaches. This variability is a major cost driver in high volume manufacturing. Because most internal antennas are forced into a small form factor by the physically small size of the electronic device incorporating the antennas, their bandwidths are reduced leaving very little production margin. Variations in frequency from unit to unit can cause antennas not to meet specifications, so 100% testing has been required at the factory. This is a costly addition to the manufacturing process, and, if eliminated, could reduce the overall antenna cost by 25–50%. Additionally, there is cost associated with yield. If the yield of these antennas can be improved from 95% to 100%, an additional 5% savings is realized in addition to the savings in eliminating expensive RF test equipment. Also, screening in quality versus designing in quality creates a truncated distribution curve with a lower Cpk (lower quality, greater standard deviation, resulting in increased failures in the field)

Even if antennas fabricated by bending metal are made perfectly, that does not guarantee that they will not be damaged during handling and transportation to a customer for assembly into such electronic devices as mobile phones or PDAs. This may force the need for special packaging or handling, and additional incoming inspection, all of which increases overall costs.

If bent-metal antennas make it through transport intact, assembly into the final product has an associated variability. The thickness of the solder paste used for surface mount re-flow can vary by 2–3 mils, changing the height of the antenna from the PCB ground plane, or more commonly from the EMI shield ground plane. Additionally, surface mount components near or under the internal antenna can vary in position or height during assembly, again causing the frequency of operation to de-tune. All of these effects are eliminated using either the internal-antenna-EMI-shielding combination or the internal antenna on stilts, as described above in conjunction with FIGS. 2–5.

Another obvious cost savings comes from combining two components into one piece-part. Not only is the total material or component cost lower, but the cost associated with handling, assembly, and inventory carrying costs are all lower. The embodiment illustrated in FIG. 3 has the additional benefit of requiring far less surface area on the PCB for mounting the antenna.

Yet another advantage is the ability to print multiple antennas on the same plastic component. These sets of antennas can be used for different frequency bands, or diversity antennas within the same band.

Antennas and EMI shields made in this fashion are more durable since there are fewer total components. This increases the mean time before failure (MTBF), a measure of component reliability.

Alternatively, if the walls of the EMI shield are continuous, the cavities created between the component and the PCB can act as a package to cover the surface mount component or even bare die, providing significant environmental protection, keeping out debris and moisture. In fact, this ability to have the plastic component act as a package for underlying components can be achieved even if the EMI shield is excluded, and the component only contains printed internal antennas. An example of such a component is shown below in FIG. 7. This component could have printed antennas located on the top side of the component, as shown in FIGS. 2 and 3, or, if no EMI shield is needed, an alternative embodiment is illustrated in FIG. 7.

Figure 7:
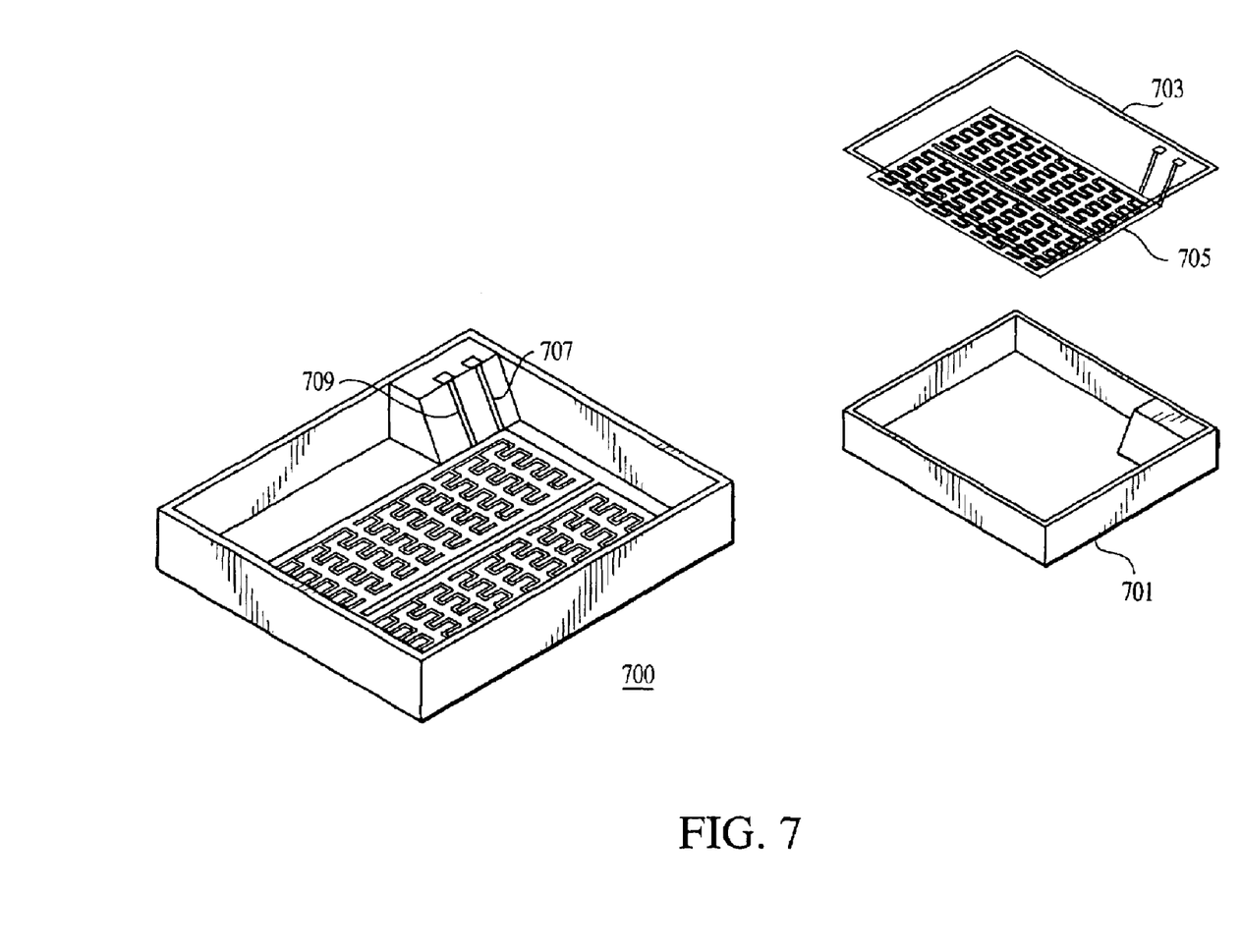
FIG. 7 is an expanded view and an exploded view of a third embodiment of a combined electromagnetic shield and antenna.

FIG. 7 shows an embodiment of a plastic antenna 700 whereby the antenna 705 is printed on the inside lid of a plastic frame 701. FIG. 7 includes an assembled view and an exploded view of a plastic antenna 700. Although no EMI shield is included, a continuous metal trace 703 is printed along the rim of the plastic frame 701. This metal rim 703 is printed on a planar surface which allows a continuous solder seal to be made around the perimeter of the antenna package 700 when the package is reflow soldered to a host printed wiring board or chip carrier. The chip carrier can be made of LTCC, alumina, FR4, or any conventional substrate material typically used in microelectronics fabrication. In this manner, the plastic antenna provides environmental protection for electronic components located directly under the antenna. Antenna metallization 705 is disposed on an interior surface of the plastic antenna 700.

Thus, the antenna 700 includes a dielectric body in the form of plastic rim 701 which is mountable to a PWB. The dielectric body defined a hollow cavity to cover electronic components mounted on the PWB under the dielectric body. The dielectric body includes a substantially planar rim 703 to electrically and mechanically contact the PWB. Antenna metallization is disposed on the dielectric body and adapted for electrical connection with the PWB.

In a variation of the embodiment to FIG. 7, the rim contains no ring of metal. Instead, the rim is adhesively attached to the host chip carrier or PWB. Another option for attachment of the dielectric rim to the host chip carrier is sonic welding, assuming the dielectric body and the chip carrier are made of plastic. However, the electrical connections to the antenna may still be reflow soldered.

In the example of FIG. 7, the antenna 705 is a DSPA. However, any type of patch antenna may be used with this packaging concept, with the caveat that the antenna dimensions will probably be larger, and one or more interior plated posts may be needed for the RF feed and ground connections. For some applications, the DSPA 705 is a preferred embodiment due to its electrically small size (largest dimension~$\lambda_o/10$), and its insensitivity to detuning caused by changes in ground plane size, component location, proximate dielectric bodies, etc. Note that the DSPA 705 has an RF feed 707 and ground connection 709 located at its perimeter. This permits the feed 707 and ground 709 traces to be printed on the same structure that forms the wall or walls of the plastic package. Typical plastic materials include grades of liquid crystal polymer (LCP) which are high temperature plastics designed to withstand high temperatures of conventional reflow solder machines. Although FIG. 7 shows a single antenna element printed on the interior of the package, multiple elements in the form of multiple antenna metallizations maybe printed on either the inside, or the outside, or both sides of the same package.

Figure 8:
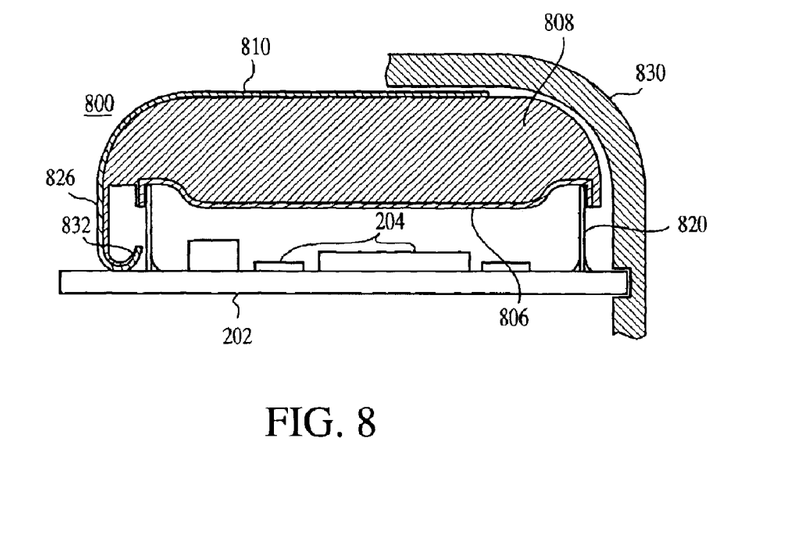
FIG. 8 is a cross sectional view of a fourth embodiment of a combined EMI shield cover and a printed antenna.

A variation of the combined antenna/EMI shield 800 is illustrated in the cross sectional view of FIG. 8. The combined antenna/EMI shield 800 includes a shield can lid 806, a body 808, an antenna 810, a feed trace 826 and a compliant tab 833. The component 800 mechanically engages an EMI shield can, illustrated in the view of FIG. 8 as side wall 820. This embodiment differs from previous embodiments in that the component 800 is not soldered to the printed circuit board (PCB) 202. Rather, it forms only the lid 806 of an EMI shield can. The body 808 of the component 800 may be injection molded from conventional low temperature plastics, which lowers the cost of the raw material.

The component 800 snaps onto or otherwise mechanically engages a conventional EMI shield wall 820 already soldered to the PCB 202. This metal shield wall 820 may be brass, copper, tin, steel, or any other conductive structure, even plated plastic such as LCP. The lid 806 is printed on the inside or lower surface of the body 808, proximate the PCB 202. Thus, the lid 806 forms shield metallization disposed on the dielectric body and adapted for electrical and mechanical connection with the walls of the EMI shield. The metal antenna 810 is printed on the outside (upper surface) of the component 800. Thus, the metal antenna 810 forms antenna metallization disposed on the dielectric body 808 and adapted for electrical connection with the PCB. In one embodiment, the metal antenna 810 may comprise a DC inductive shorted patch antenna (DSPA).

The component 800 further includes one or more compliant contacts used for RF connections. A feed trace 826 is printed on the exterior of the component 800 and terminates on the compliant tab 832. The compliant tab 832 bends into a U shape. This compliant tab 832 forms the low resistance contact needed for connecting the antenna 810 to the PCB.

For many applications, the antenna/EMI shield embodiment of FIG. 8 is superior to the reflow soldered embodiments of FIGS. 2 through 7 in the respect that the EMI shield may be easily removed, without heating, to service the shielded circuitry. During manufacturing or during repair, the EMI shield may need to be removed to permit test and replacement of components contained therein. Following this access, the antenna/shield component 800 can be re-installed without the need for special tools, since, in the illustrated embodiment, it simply snaps on.

The exterior surface of component 800 may be injection molded to fit snugly within a plastic housing 830 of a communication device such as a portable radio or radiotelephone, as suggested in FIG. 8. In fact, the printed antenna 810 does not need to be substantially planar. The D shaped profile shown in the cross sectional view of FIG. 8 could be expanded or modified to adopt many different two-dimensional and three-dimensional profiles such as a parabola, a semi-circle, an ellipse, or any other contour, which might even be concave.

As with the embodiments of FIGS. 2 through 6, the antenna embodiment in FIG. 8 will have one or more resonant frequencies influenced to a great degree by the spacing between the metalized antenna 810 and the EMI lid 806. The resonant frequencies are expected to be very consistent in production due to the tolerance on this spacing being defined by an injection mold.

From the foregoing, it can be seen that the present embodiments provide a combined electromagnetic shield and antenna. These devices are combined in a single component which may be placed on a printed circuit board, minimizing the amount of PCB real estate required to accommodate the shielding and antenna. Further, the vertical spacing between the antenna and the ground plane formed by the EMI shield is tightly and consistently controlled by using the manufactured thickness of the molded plastic body of the component. These advantages reduce the size and cost of the completed radio or other electronic device.

While a particular embodiment of the present invention has been shown and described, modifications may be made. Various features illustrated in the previous figures may be grouped together in a given antenna/EMI shield component. For instance, the voids or blind holes shown in FIG. 6 may be used in the component 800 of FIG. 8 to decrease the cost of the raw material as well as the component weight. Accordingly, it is therefore intended in the appended claims to cover such changes and modifications which follow in the true spirit and scope of the invention.

We claim:

1. An antenna and electromagnetic shield apparatus, comprising:
   a dielectric body mountable to a printed circuit board (PCB), the dielectric body including a supported portion,
   two or more support portions extending from the supported portion to mechanically engage the PCB when the dielectric body is mounted to the PCB;
   antenna metallization disposed on a first side of the dielectric body and adapted for electrical connection with the PCB; and
   shield metallization disposed on a second side of the dielectric body and adapted for electrical connection with the PCB.

2. The apparatus of claim 1 wherein the antenna metallization comprises:
   radiating metallization disposed on the supported portion; and
   contact metallization disposed on at least one of the two or more support portion.

3. The apparatus of claim 2 wherein the radiating metallization is configured to define a planar inverted F antenna.

4. The apparatus of claim 2 wherein the radiating metallization is configured to define a meander line antenna.

5. The apparatus of claim 1 wherein the shield metallization comprises a solid conductor.

6. The apparatus of claim 1 wherein the shield metallization comprises a gridded conductor.

7. The apparatus of claim 1 wherein the shield metallization comprises extended PCB contact portions along the two or more support portions of the dielectric body.

8. The apparatus of claim 1 wherein the shield metallization comprises PCB point contacts on the two or more support portions of the dielectric body.

9. The apparatus of claim 1 wherein the radiating metallization comprises:
   a first radiator disposed on a first portion of the supported portion, the first portion having a first thickness chosen to affect antenna performance of the first radiator; and
   a second radiator disposed on a second portion of the supported portion, the second portion having a second thickness chosen to affect antenna performance of the second radiator, the second thickness being different from the first thickness.

10. The apparatus of claim 9 wherein the supported portion comprises thinned portions having a third thickness at portions of the supported portion other than the first portion and the second portion.

11. The apparatus of claim 1 wherein the two or more support portions comprise a plurality of support portions positioned to define two or more cavities between the PCB, the shield metallization, and support portions of the dielectric body.

12. The apparatus of claim 1 wherein the support portions taper to define contact portions for mechanical contact with the PCB.

13. A method for manufacturing an electromagnetic magnetic shield and antenna, the method comprising:
   molding a dielectric body having a first side and a second side and having appropriate dimensions to shield circuitry portions of an electronic device, including forming support portions extending from the second side of the dielectric body; and
   forming a supported portion between the support portions;
   disposing antenna metallization on first side of the dielectric body; and
   disposing ground plane metallization on the second side of the dielectric body.

14. The method of claim 13 wherein disposing the antenna metallization comprises:
   plating metal in a predetermined pattern on one or more regions of the supported portion on the first side of the dielectric body to define an antenna radiator; and
   plating metal in a contact pattern on one or more of the support portions on the first side of the dielectric body.

15. The method of claim 14 wherein disposing the ground plane metallization comprises:
   plating metal in a ground plane pattern on the second side of the dielectric body; and
   plating connecting metal on one or more of the support portions on the second side of the dielectric body.

16. The method of claim 15 herein plating metal in a ground plane pattern comprises plating a single conductor ground plane.

17. The method of claim 15 wherein plating metal in a ground plane pattern comprises plating a gridded conductor ground plane.

18. An antenna and electromagnetic shield apparatus comprising:
   a dielectric body mountable to the walls of an EMI shield;
   antenna metallization disposed on a first side of the dielectric body and adapted for electrical connection with a printed circuit board (PCB) to form a DC inductive shorted patch antenna; and
   shield metallization disposed on a second side of the dielectric body and adapted for electrical connection with the walls of the EMI shield.

19. The apparatus of claim 18 wherein the apparatus comprises one or more compliant contacts used for RF connections.

20. The apparatus of claim 18 wherein the shield metallization comprises a gridded conductor.

21. An antenna apparatus comprising:
   a dielectric body mountable to a printed wiring board (PWB);
   wherein the dielectric body defines a hollow cavity to cover electronic components mounted on the PWB, and
   wherein the dielectric body has a planar rim to contact the PWB and wherein a metal ring is disposed on a rim of the dielectric body and configured for electrical connection with the PWB; and
   antenna metallization is disposed on the dielectric body and adapted for electrical connection with the PWB.

22. The antenna apparatus of claim 21 wherein a rim of the dielectric body is configured for adhesive connection to the PWB.

23. The antenna apparatus of claim 21 wherein a rim of the dielectric body is configured for sonic welding to the PWB.

24. The antenna apparatus of claim 21 wherein the antenna metalization is disposed on an interior surface of the dielectric body.

25. The antenna apparatus of claim 21 wherein the antenna metalization is disposed on an exterior surface of the dielectric body.

26. The antenna apparatus of claim 21 wherein the antenna metallization comprises multiple antenna metalizations disposed on the dielectric body.

* * * * *